X. CAVERNO.
PUMPING APPARATUS.
APPLICATION FILED MAR. 18, 1907.
955,580.
Patented Apr. 19, 1910.
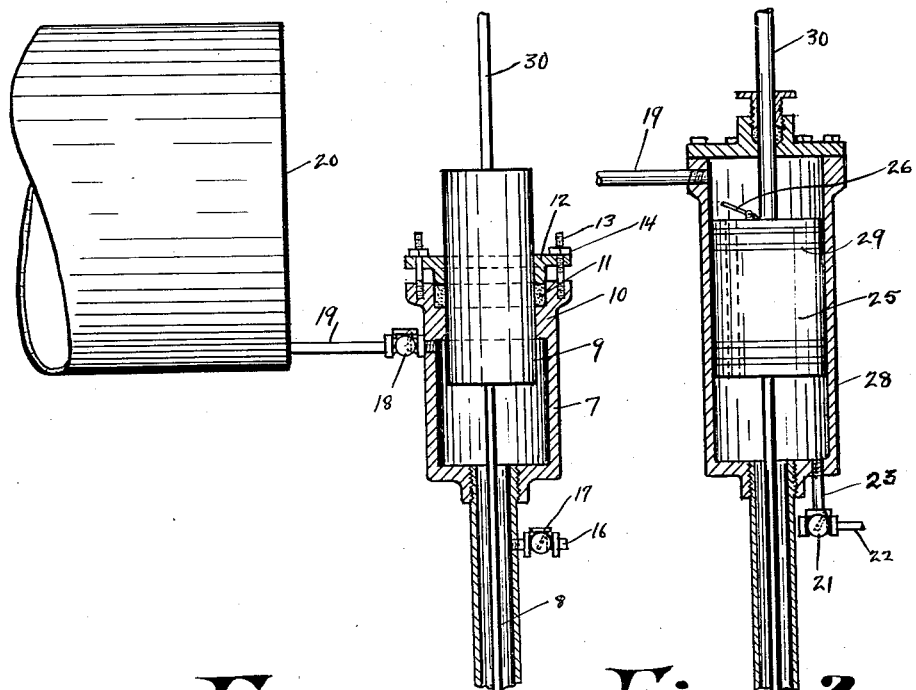
Fig. 1.   Fig. 2.
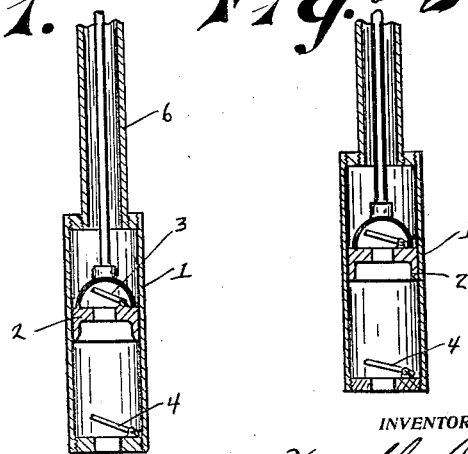
WITNESSES:
O. R. Erwin
H. M. Schultz
INVENTOR
Xenophon Caverno
BY
Erwin & Wheeler
ATTORNEYS

UNITED STATES PATENT OFFICE.

XENOPHON CAVERNO, OF KEWANEE, ILLINOIS.

PUMPING APPARATUS.

955,580.  Specification of Letters Patent.  Patented Apr. 19, 1910.

Application filed March 18, 1907. Serial No. 362,883.

*To all whom it may concern:*

Be it known that I, XENOPHON CAVERNO, a citizen of the United States, residing at Kewanee, county of Henry, and State of Illinois, have invented new and useful Improvements in Pumping Apparatus, of which the following is a specification.

My invention relates to improvements in apparatus for pumping both water and air into a closed tank.

The object of this invention is to provide means whereby two cylinders of unequal size may be employed for pumping both water and air without loss of power over that required for pumping water and without the use of auxiliary pump cylinders or special appliances.

In the following description reference is had to the accompanying drawings, in which, Figure 1 is a vertical sectional view of the pumping apparatus, showing a portion of the tank to which the water and air is supplied. Fig. 2 is a similar view of the pumping apparatus, showing a slightly modified form of construction.

Like parts are identified by the same reference characters in both views.

Referring to Fig. 1, 1 is an ordinary pump cylinder provided with a piston 2 having a valve 3, the lower end of the pump cylinder being provided with an inlet valve 4. The upper end of the cylinder is connected by a pipe 6 with an upper cylinder 7 and a piston rod 8 extends through the pipe 6 and connects with a plunger 9 operating through the upper cylinder head 10 of the cylinder 7. Suitable packing 11 is employed around the plunger piston 9, this packing being compressed by an annular cap piece 12, adjusted by means of screws 13 and nuts 14. The plunger 9 is of greater diameter than the interior diameter of cylinder 1 so that when this plunger is lifted there will be a greater space provided than that occupied by the water lifted by piston 2.

The quantity of water coming from cylinder 1 will be insufficient to fill the space in cylinder 7 underneath the plunger, and air will be drawn in through an air inlet pipe 16, which is preferably provided with a check valve at 17 to prevent the escape of water through this pipe during the down stroke of the plunger. On the down stroke, the water and air in the cylinder 7 are forced through the check valve 18 and pipe 19 to the tank 20, and it will be observed that with this construction, the quantity of air drawn in will be equal to the displacement of plunger 9 over the capacity of cylinder 1.

In the construction shown, the air inlet 16 is connected with the pipe 6, preferably near the upper end thereof, although it may be connected at any desired point, or it may be connected at the lower end of the cylinder 7 as shown in Fig. 2, where a similar pipe 23 provided with a check valve 21 and a branch admission duct 22 is employed.

The construction shown in Fig. 2, aside from the connection of the air inlet, is the same as that shown in Fig. 1 with the exception that a piston 25 is employed in the upper cylinder and provided with a valve 26 to permit the passage of air and water above the piston during its down stroke.

While any form of piston may be employed in the larger cylinder 28, shown in Fig. 2, yet it is preferable to employ a piston similar to those used for pumping air, or in engines, to-wit: a cylindrical body provided with packing rings 29. The necessity or desirability of such a piston will of course depend upon the pressure in the tank to which the air and water is pumped. Where the pressure is low, any ordinary piston will be sufficient. Piston rods 30 are employed in either form of construction, connecting with any suitable source of motive power for operating a pump.

It will be observed that with either form of construction illustrated in the drawings, the amount of water supplied is regulated by the lower cylinder and piston, since the movement of the plunger or piston in the upper cylinder will create no vacuum during its upward stroke beyond that required to open the air inlet valve and draw in the air, and since the air inlet is located below the field of piston or plunger movement. On the down-stroke, check valve 4 in the lower cylinder closes and the water in that cylinder is forced through the piston 2 as it descends and there is therefore no opportunity for the water column to drop during this stroke.

While I have used the term "plunger" in describing the part 9 and the term "piston" in describing the part 25, I regard the part 9 as constituting one form of piston, and use the term piston in my claims as a generic term of sufficient scope to include the plunger or any other equivalent device.

The structure illustrated in Fig. 1 is not claimed specifically in this application, claims therefor being made in a separate application which I filed March 18th, 1907, Serial # 362,884.

Having thus described my invention what I claim as new and desire to secure by Letters Patent is,

1. In a device of the described class, the combination of a receiving chamber, a pump connected to supply said chamber and provided with an air inlet check valve arranged to admit air thereto from the beginning of its suction stroke, and a second pump of less capacity, arranged to deliver water to the first mentioned pump during its suction stroke and simultaneously with the admission of air thereto.

2. In a device of the described class, the combination of a pump provided with inlet and outlet ports, and an air admission port provided with an inwardly opening valve, arranged to preclude the formation of a vacuum during the suction stroke of the pump, and another pump of less capacity, having its outlet connected with the inlet port of the first mentioned pump.

3. In a device of the described class, the combination of a pump provided with inlet and outlet ports and an air admission port below the field of piston movement provided with an inwardly opening valve, a second pump of less capacity, a tubular connection between the outlet port of the second pump and the inlet port of the first mentioned pump, pistons in said pumps provided with valved passages therethrough, and a piston rod extending through said tubular connection and connecting the pistons of the respective pumps.

4. In a device of the described class, the combination of a set of pump cylinders of unequal interior diameter, connected with each other by a communicating duct, pistons in said cylinders, connected with each other, a receiving chamber, a valved passage leading from the larger cylinder to the receiving chamber, and an air inlet check valve arranged to admit air to the larger cylinder below the piston therein at the beginning of its suction stroke.

5. The combination of two cylinders having different interior diameters, a receiving chamber having a valved duct leading thereto from the larger cylinder, a duct connecting the cylinders, a piston in each cylinder, a piston rod extending through said duct and connecting the pistons and an air inlet valve arranged to admit air underneath the upper piston at the beginning of its upward stroke.

6. A pump of the character described comprising two cylinders of different capacities, the larger cylinder being supported above the smaller cylinder and being in communication therewith, a piston in each of said cylinders, and means for actuating said pistons, said larger cylinder having an air inlet at a point below the lower limit of movement of the piston therein.

7. A pump of the character described comprising two cylinders of different capacities having their adjacent ends connected one to the other, the smaller of said cylinders having a water inlet and the larger of said cylinders having a water outlet, a piston mounted in each of said cylinders, and means for actuating said pistons, one of said cylinders having an air inlet at a point above the upper limit of movement of the piston in the lower cylinder and below the lower limit of movement of the piston in the upper cylinder.

8. In a device of the class described, the combination of a pump provided with an air inlet check valve arranged to admit air thereto from the beginning of its suction stroke, and a second pump of less capacity, arranged to deliver water to the first mentioned pump during its suction stroke and simultaneously with the admission of air thereto.

9. In a device of the class described, the combination of a pump, provided with inlet and outlet ports and an air admission port below the field of piston movement provided with an inwardly opening valve, a second pump of less capacity, pistons in said pumps provided with valved passages therethrough, a piston rod connecting the pistons of the respective pumps.

10. In a device of the described class, the combination of a set of pump cylinders of unequal diameter, pistons in said cylinders, connected with each other, and an air inlet check valve arranged to admit air to the larger cylinder below the piston therein at the beginning of its suction stroke.

11. The combination of two cylinders having different interior diameters, a piston in each cylinder, a piston rod connecting the pistons and an air inlet valve arranged to admit air underneath the upper piston at the beginning of its upward stroke.

In testimony whereof I affix my signature in the presence of two witnesses.

XENOPHON CAVERNO.

Witnesses:
A. W. ERRETT, Jr.,
F. A. DICKINSON.